US012050157B2

(12) United States Patent
Young

(10) Patent No.: US 12,050,157 B2
(45) Date of Patent: Jul. 30, 2024

(54) WATER LEAK DETECTION DEVICE AND INTEGRATION PLATFORM

(71) Applicant: ENERO LABS LLC, Wilmington, DE (US)

(72) Inventor: Kenneth Young, Blue Bell, PA (US)

(*) Notice: Subject to any disclaimer, the term of this patent is extended or adjusted under 35 U.S.C. 154(b) by 0 days.

(21) Appl. No.: 17/259,536

(22) PCT Filed: Jul. 8, 2019

(86) PCT No.: PCT/US2019/040822
§ 371 (c)(1),
(2) Date: Jan. 11, 2021

(87) PCT Pub. No.: WO2020/014133
PCT Pub. Date: Jan. 16, 2020

(65) Prior Publication Data
US 2021/0164860 A1    Jun. 3, 2021

Related U.S. Application Data

(60) Provisional application No. 62/695,548, filed on Jul. 9, 2018.

(51) Int. Cl.
*G08B 21/18* (2006.01)
*G01M 3/28* (2006.01)
(Continued)

(52) U.S. Cl.
CPC .......... *G01M 3/2815* (2013.01); *G06N 20/00* (2019.01); *G08B 5/222* (2013.01); *G08B 21/18* (2013.01)

(58) Field of Classification Search
CPC ...... G01M 3/2815; G01M 3/18; G01M 3/243; G01M 3/2807; G06N 20/00;
(Continued)

(56) References Cited

U.S. PATENT DOCUMENTS 10,121,353 B1 * 11/2018 Billman ............... G01M 3/40
11,087,404 B1 *  8/2021 Devereaux .......... G06Q 50/163
(Continued)

OTHER PUBLICATIONS

International Search Report and Written Opinion mailed on Sep. 26, 2019 in Co-pending Application PCT/US2019/040822.

*Primary Examiner* — Nay Tun
(74) *Attorney, Agent, or Firm* — Troutman Pepper Hamilton Sanders LLP

(57) ABSTRACT

A water monitoring system has aback-end system comprising an authentication module, a machine learning module, an alerts module, and a third-party module. The back-end system remotely connects to a local system which has a water monitoring device and the authentication module authenticates the connection relative to a user. The back-end system remotely connects to a third-party system using the third-party module and the authentication module authenticates the connection relative to the same user. The back-end system receives data from the local system and the third-party system, the machine learning module analyzes the data to determine one or more rules which identify water usage as intended or unintended, and the alerts module provides an alert to one or more of the local system, the third-party system, or a client device when the water monitoring device measures water flow data which indicates a leak according to the one or more rules.

16 Claims, 11 Drawing Sheets

(51) Int. Cl.
*G06N 20/00* (2019.01)
*G08B 5/22* (2006.01)

(58) Field of Classification Search
CPC ...... G08B 25/222; G08B 21/18; G08B 5/222;
G08B 21/20; G08B 25/08; H04L 67/12;
G05B 15/02; G06Q 50/06; E03B 7/07;
E03B 7/003; E03B 7/071; Y02A 20/00;
Y02A 20/15; G01F 15/14; G01F 15/005;
G01F 15/063
See application file for complete search history.

(56) References Cited

U.S. PATENT DOCUMENTS

| | | | |
|---|---|---|---|
| 11,105,705 B1* | 8/2021 | Lowitz | G05D 7/0641 |
| 2011/0303311 A1 | 12/2011 | Klicpera | |
| 2013/0248023 A1* | 9/2013 | Estrada, Jr. | E03B 7/071 |
| | | | 137/551 |
| 2015/0070192 A1 | 3/2015 | Kates | |
| 2017/0131174 A1* | 5/2017 | Enev | E03B 7/07 |
| 2018/0230681 A1* | 8/2018 | Poojary | E03B 7/072 |
| 2018/0259131 A1* | 9/2018 | Ravid | E03B 7/071 |
| 2018/0291911 A1* | 10/2018 | Ward | F04F 5/10 |
| 2018/0321694 A1* | 11/2018 | Ravid | F16K 37/0025 |
| 2019/0087510 A1* | 3/2019 | Rexach | G06F 16/904 |
| 2020/0103306 A1* | 4/2020 | Mine | G01M 3/007 |
| 2020/0148552 A1* | 5/2020 | Yizhack | E04H 4/1281 |

\* cited by examiner

WATER LEAK DETECTION DEVICE AND INTEGRATION PLATFORM

CROSS REFERENCE TO RELATED APPLICATIONS

This application is a national phase filing under 35 U.S.C. § 371 of International Patent Application No. PCT/US2019/040822 filed Jul. 8, 2019, which claims priority to U.S. Provisional Application No. 62/695,548 filed Jul. 9, 2018, each of which are incorporated herein by reference in their entirety.

TECHNICAL FIELD

The present disclosure relates generally to a water leak detection device, and, more particularly, to an overall water meter integration platform utilizing the water leak detection device and other connected devices.

BACKGROUND

Plumbing systems are a critical aspect of all modern buildings and introduce significant risk due to the nature of inserting a pressurized water supply throughout a structure. Plumbing leaks, from small drips to burst pipes, can cause significant damage to any building. Burst pipes and water damage present significant costs for repairs and increased water and sewer bills for homeowners and property managers. Further, billions of dollars are paid by insurers in water damage claims every year. A significant portion of these costs could have been avoided if water leaks were identified quickly and remediation steps implemented soon thereafter. In addition, leaks, even small drips, waste a significant amount of water, thereby raising water costs and reducing valuable resources.

Presently, much of the problems associated with water leaks stem from the relative inaccessibility of plumbing systems in both residential and commercial settings. For example, a leak may be behind a wall or in a cabinet which is not readily apparent. Further, even when leaks are found or major flooding events occur, the procedure for addressing the problem and turning off the water supply may be an unfamiliar process, which may delay remedial actions and enhance damage and costs. In most situations, a water meter and main valve is located at a main water entry point. The water meter tracks usage information for the home or commercial space. The main valve, when closed, ceases the flow of water to the downstream plumbing and in many cases is the only immediate option for stopping a leak or burst pipe flow. The main valve is usually located in a remote location (a basement or utility room) which may or may not be anywhere near the leak or anyone capable of finding the valve and turning off the water.

Currently, there are systems which are configured to automatically shut off the water at the main valve under certain conditions. For example, some systems are configured to turn off the main valve when the water flow continues through the water meter for an extended period of time. Other systems rely on an array of sensors and valves spread throughout the building in order to detect various circumstances which cause the main valve to be closed. However, these automatic shutoff systems and other current devices are not ideal and suffer from drawbacks.

In particular, systems which monitor the water meter and shut off the valve only when significant deviations from normal flow occur do not address most leak situations and likely will shut off the water well after much of the damage has already occurred. Systems which utilize a suite of sensors throughout a building are complicated and expensive and often rely on specific input from a user to understand when conditions are normal and when a leak is occurring.

The present disclosure is directed to overcoming these and other problems of the prior art.

SUMMARY

In some embodiments, a computer-implemented method for detecting a leak in a water flow system is disclosed. The method includes connecting to a water monitoring device and a third-party system, receiving water flow data from the water monitoring device, receiving location data from the third-party system, determining a threshold parameter based on the location data, and comparing the water flow data to the threshold parameter in order to determine that there is a leak in the water flow system.

In other embodiments, a water monitoring system is disclosed. The water monitoring system includes a back-end system comprising an authentication module, a machine learning module, an alerts module, and a third-party module. The back-end system is configured to remotely connect to a local system comprising a water monitoring device and the authentication module is configured to authenticate the connection related to a user. The back-end system is configured to remotely connect to a third-party system using the third-party module and the authentication module is configured to authenticate the connection related to the same user. The back-end system receives data from the local system and the third-party system, the machine learning module is configured to analyze the data to determine one or more rules which identify water usage as intended or unintended, and the alerts module is configured to provide an alert instruction to one or more of the local system, the third-party system, or a client device when the water monitoring device measures water flow data which indicate a leak according to the one or more rules.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Figure 1:
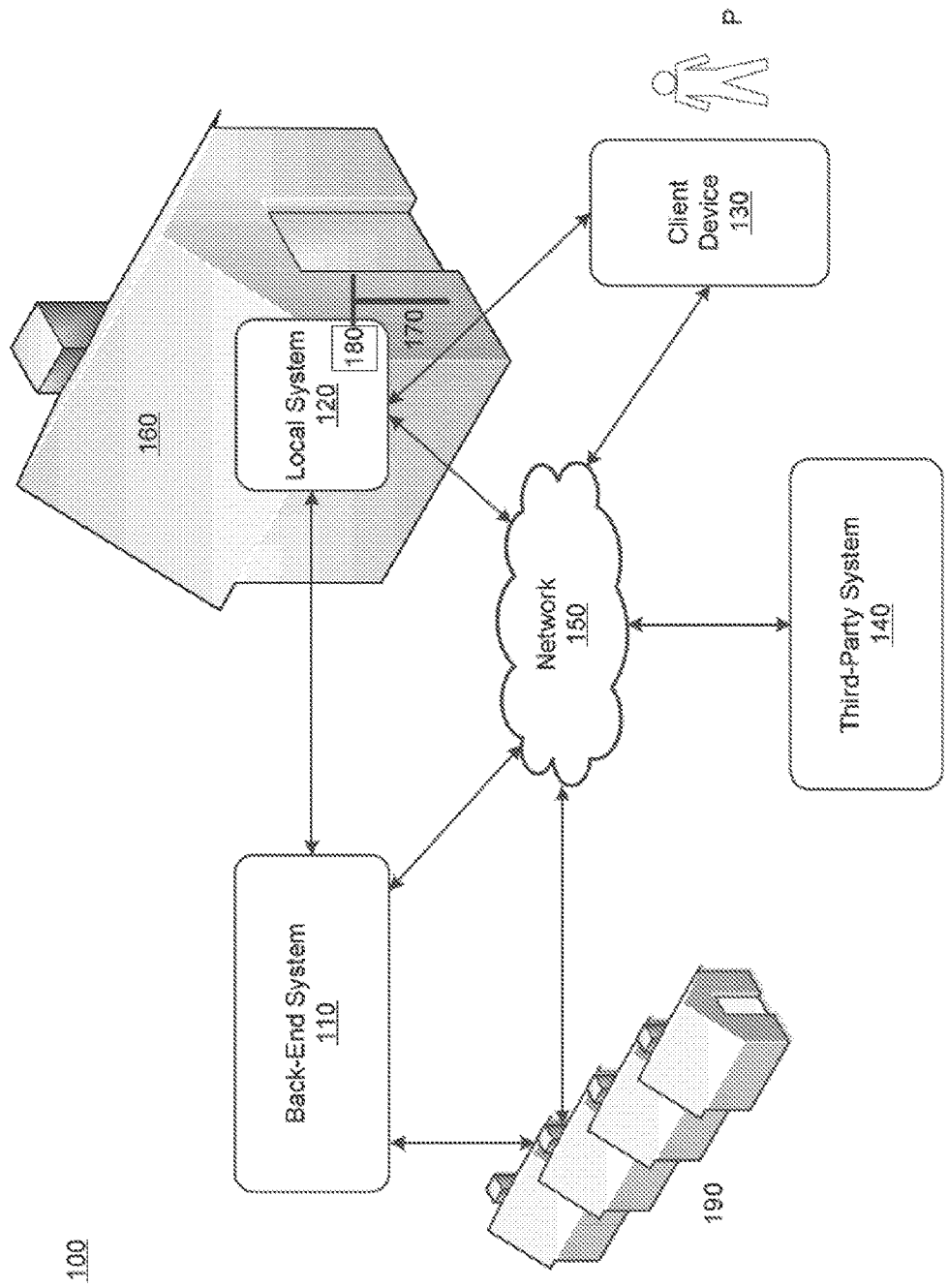
FIG. 1 is a schematic diagram of an exemplary water monitoring system, consistent with disclosed embodiments.

The present disclosure describes a water leak detection device and an integration platform which allows the detection device to be compatible with other devices and incorporates collected data from all devices within the system, including third-party devices, in order to provide a comprehensive system which fits within an overall building automation scheme. The water leak detection device includes monitoring components which are configured to collect data related to a flow of water into or through a building, such as a residence or commercial structure, and computing components which are configured to establish rules for determining when a leak or other unintended water event occurs within the plumbing system. The integration platform provides a centralized data location for receiving collected data from a user's water leak detection device, other user's water leak detection devices, user client devices, and third-party devices and systems, thereby enabling the water leak detection device to easily integrate into a user's daily life by providing multiple communication options for learning from and alerting the user. The integration platform further enhances the data set which is available to the water leak detection device for setting rules which can be implemented to accurately identify leaks and other unwanted water flows and perform corrective actions accordingly.

The water leak detection device is connected to a back-end system which includes a specialized configuration which incorporates machine learning to determine the customized rules for the detection device to use in determining when a leak event occurs. The back-end system collects data from multiple different devices and sources and uses artificial intelligence in order to learn behavior patterns of the users and improve the algorithms that make decisions on system modes and corrective actions.

The water leak detection device incorporates an intuitive control system which is convenient to the user. The control panel is configured for providing information to the user and receiving input data. The control panel provides a connection point to the user which is conventionally not present in water meter systems and allows for customized input/output. The control panel eases manual control over the system, providing access to control one or more valves or water flow restriction mechanisms within the plumbing system. The control system further includes network compatibility which allows the control panel to be presented on one more client devices, such as personal computers or mobile devices such as smart phones and tablets. The back-end system may include features which provide a mobile application to the user's mobile device, thereby serving as the connection point and allowing the user to provide control input and receive information such as statistics and alerts. The integration with third-party systems provides yet another channel for communication with the user.

The water leak detection device and integration platform provide an efficient and integrated approach to alerting a user of a leak situation. For example, the integration platform at the local and back-end locations and connections to third-party systems provides several options for performing an action which ultimately helps to temper any damage caused by the leak. In one example, the integration with third-party systems allows an alert to be transmitted in a manner which maximizes the possibility that it will be viewed by the user. Examples include a message pushed to a smart phone, an audible alert played through a security system or smart speaker, or a phone call from an operator. Further, the integration of third-party systems allows for additional data, such as location data, to be considered when determining how to contact the user. For instance, if the user is at home, an alarm may sound, and if the user is away, a call or text message may be sent. These features can carry into other corrective actions, including shutting off the water, which is an action that may be automatically carried out in certain situations.

While the embodiments described herein are discussed in relationship to a plumbing system (also referred to herein as a water flow system), it should be understood that the disclosed systems, devices, and components are not limited to being used with water flow systems. The disclosed embodiments may be applicable to other fluid systems, such as natural gas systems, cooling systems, lubrication systems, vehicles, etc.

FIG. 1 is a schematic diagram of a water monitoring system 100. In an exemplary embodiment, the water monitoring system 100 includes a back-end system 110, a local system 120, a client device 130, a third-party system 140, and a network 150. As shown, the back-end system 110 may be a central computing system configured to connect to the local system 120, client device 130, and third-party system 140 either directly or through the network 150. The network 150 is shown as a single network but can be multiple different networks facilitating connections between components of the water monitoring system 100. For example, the back-end system 110 and local system 120 may be directly connected.

The back-end system 110 is a computing device which is configured to perform one or more monitoring functions through processing and data communication with the other components of the system 100. The back-end system 110 may be a server that includes components, including processors, memory, databases, etc., which enable analysis, alerts, and action based on data received from the local system 120 (or other component of system 100) and through the transmission of data to the local system 120 (or other component of the system 100).

The local system 120 is associated with a building or structure 160 which includes a water flow system 170. The water flow system 170 may be a network of pipes which deliver water to fixtures located throughout the interior and/or exterior of the building 160. These include kitchen fixtures, bathroom fixtures, outdoor faucets, sprinkler systems, etc. The building 160 may be a residential or commercial building. The building 160 may represent a portion of an overall building, such as a townhome, apartment, or office space. The local system 120 is connected to the water flow system 170, such as at a main water inlet 180.

The local system 120 is a computing device which is configured to perform one or more monitoring functions through processing and data communication with the other components of the system 100. The local system 120 may include a personal computing device, such as a laptop or desktop computer, or may be built into a separate device. The local system 120 preferably includes one or more processors and memory devices which enable the monitoring processes described herein.

The local system 120 is configured to collect water flow data from the water flow system 170, such as flow rate, temperature, pressure, etc. The local system 120 is configured to provide the water flow data to the back-end system 110. The local system 120 is also configured to perform actions based on the water flow data and other inputs. For example, the local system 120 may be configured to provide information to a control panel or the client device 130 to inform a user P. While the local system 120 is shown associated with a single building 160 and user P, it should be understood that a plurality of local systems associated with other buildings 190 may also be connected as part of the water monitoring system 100. These additional local system provide additional data to the back-end system 110 which can be used in generating rules and features which are provided to the local system 120. In other words, the back-end system 110 is configured to learn from the data and improve the connected systems over time.

The client device 130 is a computing device which is connected to the network 150 for communication with other devices in the water monitoring system 100. The client device 130 may be, for example, a mobile device such as a smart phone or tablet. In other embodiments, the client device 130 may be a smart speaker, such as those provided by Amazon, Apple, or Google. In other embodiments, the client device 130 may be a laptop or desktop computer. In one aspect, the client device 130 is configured as a terminal to present information to the user P. For example, the client device 130 includes a screen which can provide information, such as measurements, usage statistics, and alerts, to the user P. In another aspect, the client device 130 is configured to collect data as input from the user P. This data may include input such as settings or responses to questions regarding water usage. In another aspect, the data may include data which is normally collected through third-party functions of the client device 130. For example, the client device 130 may collect location data which is associated with the user P. In another example, the client device 130 may collect voice data based on captured speech of the user P.

The third-party system 140 is an additional computing device which is interconnected within the water monitoring system 100. For example, the third-party system 140 may be associated with a third-party entity, such as an entity which provides a service to the user P and which collects data. In one embodiment, the third-party system 140 is associated with a virtual assistant service, such as Alexa® (Amazon), Siri® (Apple), Google Assistant®, or the like. The third-party system 140 may include a server or other computing device which receives data from a client device, such as the client device 130.

One or more of the back-end system 110, local system 120, and third-party system 140 may include a mobile application which is provided to the user P through the client device 130. The client device 130, through the mobile application(s) provides an interface for the user P to control one or more aspects of the components of the water monitoring system 100. The back-end system 110 preferably further includes a configuration which enables and eases integration of third-party services into the overall water monitoring system 100. For example, the back-end system 110 may be configured with an open API which enables integration of third-party components and services within the same network 150. In this way, the back-end system 110 is configured to augment the water monitoring services provided through the local system 120 with data and services which are associated with the third-party system 140.

The network 150 includes one or more network connections which enable data transfer between one or more components of the water monitoring system 100. For example, the network 150 may be the Internet, with each system within the water monitoring system 100 including an Internet connection device. The network 150 may also include one or more connections through Wi-Fi or Bluetooth™ which enable data transfer between components. In some embodiments, the network 150 may include one or more cloud-computing services, such as data storage and transfer.

Figure 2:
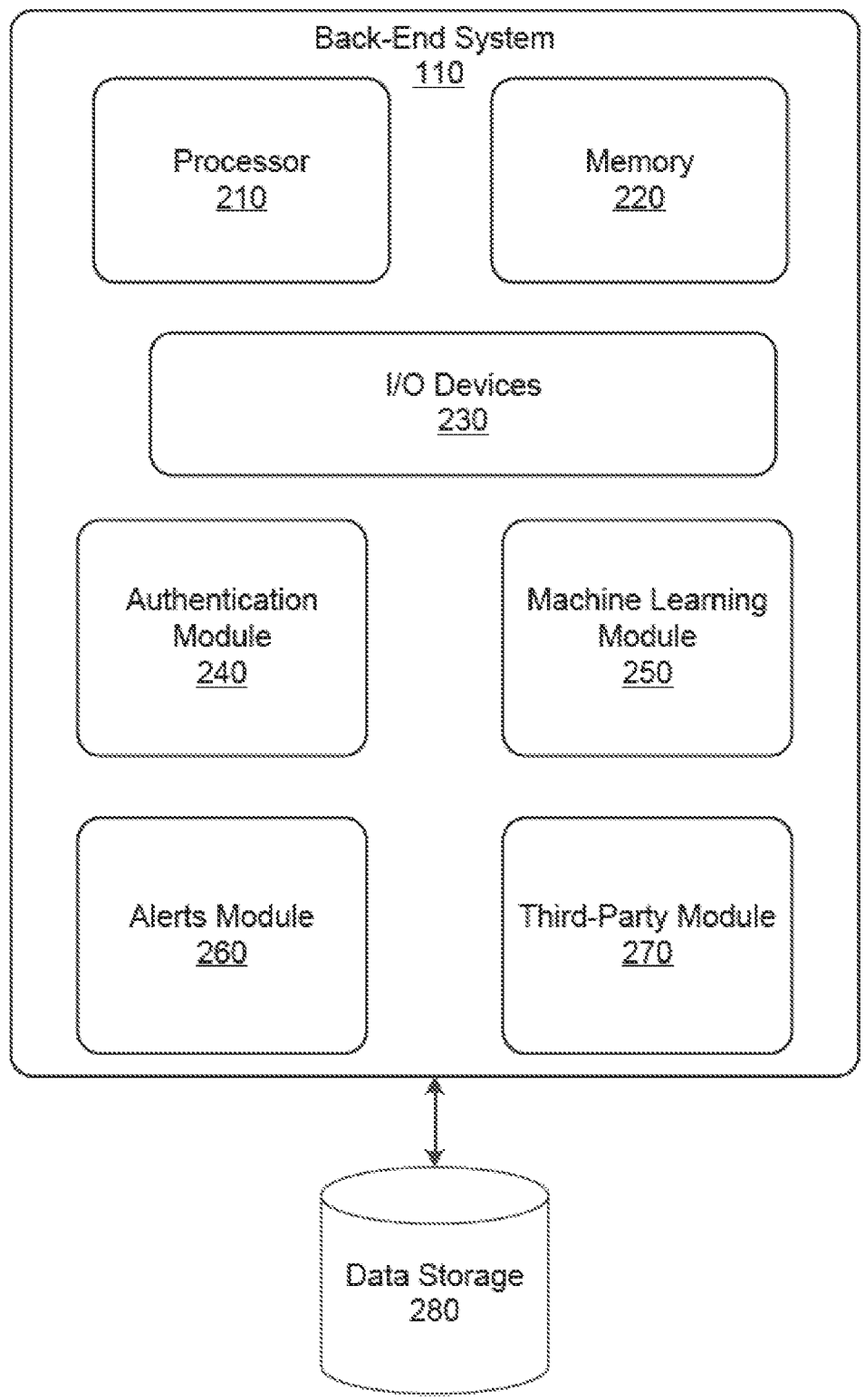
FIG. 2 is a schematic diagram of an exemplary back-end system of the water monitoring system of FIG. 1, consistent with disclosed embodiments.

FIG. 2 is a schematic diagram of an exemplary embodiment of the back-end system 110. The back-end system 110 includes a processor 210, memory 220, one or more I/O devices 230, one or more control modules 240-270, and a data storage device 280. The processor 210 and memory 220 may be specifically configured to implement the disclosed processes. The I/O device 230 may include, for example, communication components which enable the back-end system 110 to send and receive data to and from other components of the water monitoring system 100.

The control modules 240-270 may include, for example, an authentication module 240, a machine learning module 250, an alerts module 260, and a third-party module 270. The control modules 240-270 may be implemented in hardware or software. For example, the control modules 240-270 may include software instructions which are stored in the memory 220 or in their own hardware component and which are executed by the processor 210 in order to carry out an associated process. The control modules 240-270 are exemplary and other control modules may be used in addition to or in place of the control modules described herein. Moreover, while the control modules 240-270 are depicted as separate components of the back-end system 110, it should be understood that the control modules may be interconnected, combined, or located elsewhere within the water monitoring system 100.

The authentication module 240 is configured to monitor and authenticate data communications between the back-end system 110 and other devices within the water monitoring system 100. For example, the authentication module 240 is configured to provide an access token for each session between back-end system 110 and local system 120, back-end system 110 and client device 130, and back-end system 110 and third-party system 140. The back-end system 110 stores information about the user P, including information which identifies the local system 120, client device 130, and any third-party accounts associated with the user P. The authentication module 240 is configured to store and recall a unique token to distinguish each device upon communication with the back-end system 110, thereby associating multiple devices with a single user P and enabling the back-end system 110 to distinguish between them.

The machine learning module 250 is configured to analyze data received from the network 150 and identify patterns and generate rules which help to define behavior of the user P and the logic which will be used within the water monitoring system 100 for alerting the user P. For example, the machine learning module 250 may receive water usage statistics including amount of water usage and timing of water usage to determine patterns which define the normal usage of water by the user P at the building 160. The machine learning module 250 may also consider data across multiple local systems associated with the plurality of buildings 190. The machine learning module 250 is configured to use the usage data to determine rules for when water usage is likely to be planned and when it is indicative of a leak (e.g., pipe burst). The machine learning module 250 may also be configured to determine rules for different water usage modes. For example, the machine learning module 250 may determine when the local system 120 should be placed in a "home" or "away" mode. These modes may include different usage expectations, further refining the capability of the back-end system 110 to determine between genuine water usage and leaks.

The alerts module 260 is configured to provide a message or alert to one or more devices within the water monitoring system 100. For example, the alerts module 260 may receive an indication that a major leak is occurring at the building 160 and route a message to the user P through the local system 120, the client device 130, and/or the third-party system 140. The alerts module 260 is also configured to receive information back from local system 120, the client device 130, and/or the third-party system 140 which can be used to stop the alert. For example, the user P may provide input to the client device 130 which is delivered to the alerts module 260. The input may indicate that the user P is not home and a corrective action, such as turning off the water, should be taken. The alerts can be customized and may depend on the situation. For example, the machine learning module 250 may cause the alerts module 260 to send different messages depending on the type of leak identified and the home/away status of the user P.

In an exemplary embodiment, the alerts module 260 is configured to determine an alert instruction depending on the leak situation. The alert instruction may include sending an alert to the user P through the client device P. In another example, the alert instruction may include performing a corrective action, such as by automatically shutting off the water through the local system 120.

The third-party module 270 is configured to facilitate communication between the back-end system 110 and the third-party system 140. In one embodiment, the third-party module 270 is an open API device which allows various third-party systems 140 to integrate with the back-end system 110. The third-party module 270 is at least partly responsible for integrating the local system 120 into an overall home automation scheme which accomplishes several objectives. First, the integration of third-party systems 140 provides additional access to data which is relevant to the water monitoring system 100. Second, the third-party module 270 allows the user P to interact with the back-end system 110 through existing automation tools, such as a smart speaker. In this way, the local system 120 and/or an associated device, becomes an additional automation tool or an Internet of Things device which is part of an open system.

Figure 3:
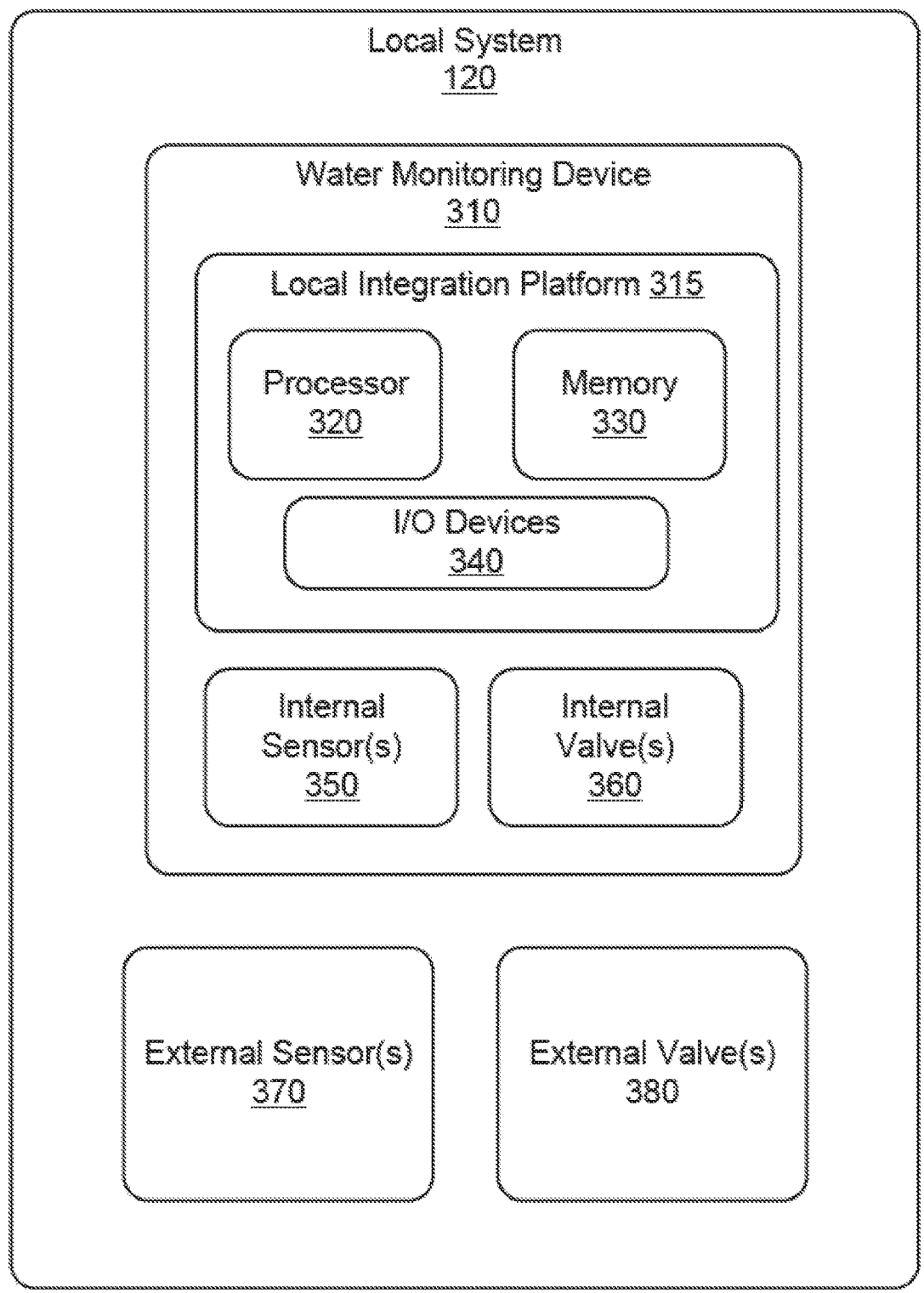
FIG. 3 is a schematic diagram of an exemplary local system of the water monitoring system of FIG. 1, consistent with disclosed embodiments.

FIG. 3 is a schematic diagram of an exemplary embodiment of the local system 120. The local system 120 may include a water monitoring device 310 which has a local integration platform 315. The local integration platform includes at least a processor 320, a memory 330, and I/O devices 340. The water monitoring device 310 further includes one or more internal sensors 350 and one or more internal valves 360. The local system 120 may also include one or more external sensors 370 and one or more external valves 380. It should be understood that the depiction of the local system 120 is exemplary and that other arrangements are possible, including various connections between the components, integration of the components, or movement of the components elsewhere within the water monitoring system 100.

The water monitoring device 310 is installed in the building 160 to monitor the water flow system 170 at the main water inlet 180. The integration platform 315 includes computing components which are configured to connect the local system 120 to the network 150 and provide collected data to the back-end system 110 and connects the water monitoring device 310 to the other components of the water monitoring system 100. The integration platform 315 thereby integrates the water monitoring device 310 into an overall automation scheme and thus can be viewed as an Internet of Things device which serves as a water monitoring data source. The processor 320 is configured to execute instructions stored in the memory 330 in order to perform one or more associated processes, such as determine when and what data to send to the back-end system 110. The I/O devices 340 include an interface such as a touch screen which presents information to the user P. The I/O devices 340 also include data connection elements which facilitate data communication with the other components of the water monitoring system 100.

The internal sensors 350 and internal valves 360 are mechanical components of the water monitoring device 310. The internal sensors 350 may include, for example, flow rate, temperature, and pressure sensors which are configured to measure associated parameters at the main water inlet 180. The internal valves 360 include one or more valves which are configured to control flow through the water flow system 170 at the main water inlet 180. The internal valves 360 may include, for example, an automatic shut-off valve which is controlled by the water monitoring device 310 to cease the flow of water. The internal valves 360 may also include a manual shut-off valve which allows the user P to stop the water flow.

The external sensors 370 and external valves 380 are mechanical components of the local system 120 which may be located remote from the water monitoring device. The external sensors 370 could include one or more pressure, temperature, moisture sensors, or proximity sensors which are configured to detect a parameter somewhere in the building 160 other than at the main water inlet 180. For example, a moisture sensor may be placed at a potential leak spot such that the water monitoring device 310 can be configured to detect a leak based on a reading from one of the external sensors 370. The external valves 380 may include one or more remote valves located somewhere in the water flow system 170 other than the main water inlet 180. The external valves 380 may be remotely controllable by the local integration platform 315 to turn off only a portion of the water flow in the water flow system 170. For example, a leak may be detected by an external sensor 370 in a particular room of the building 160 and the water monitoring device 310 may close an external valve 380 associated with that particular room such that the water flow is stopped to the location of the leak, but the entire water flow system 170 is not shut off.

In embodiments in which the local system 120 is associated with a commercial building, such as an apartment or office building, the local system may include a plurality of water monitoring devices 310, each at a separate location (e.g., to monitor separate apartments or offices). A central integration platform 315 may be connected to each of the water monitoring devices 310 and may collect data from each and transmit the data to the back-end system 110. The integration platform 315 may include an authentication module which is configured to identify the particular water monitoring device 310 and store a token which associates a user P with the correct water monitoring device 310.

Figure 4:
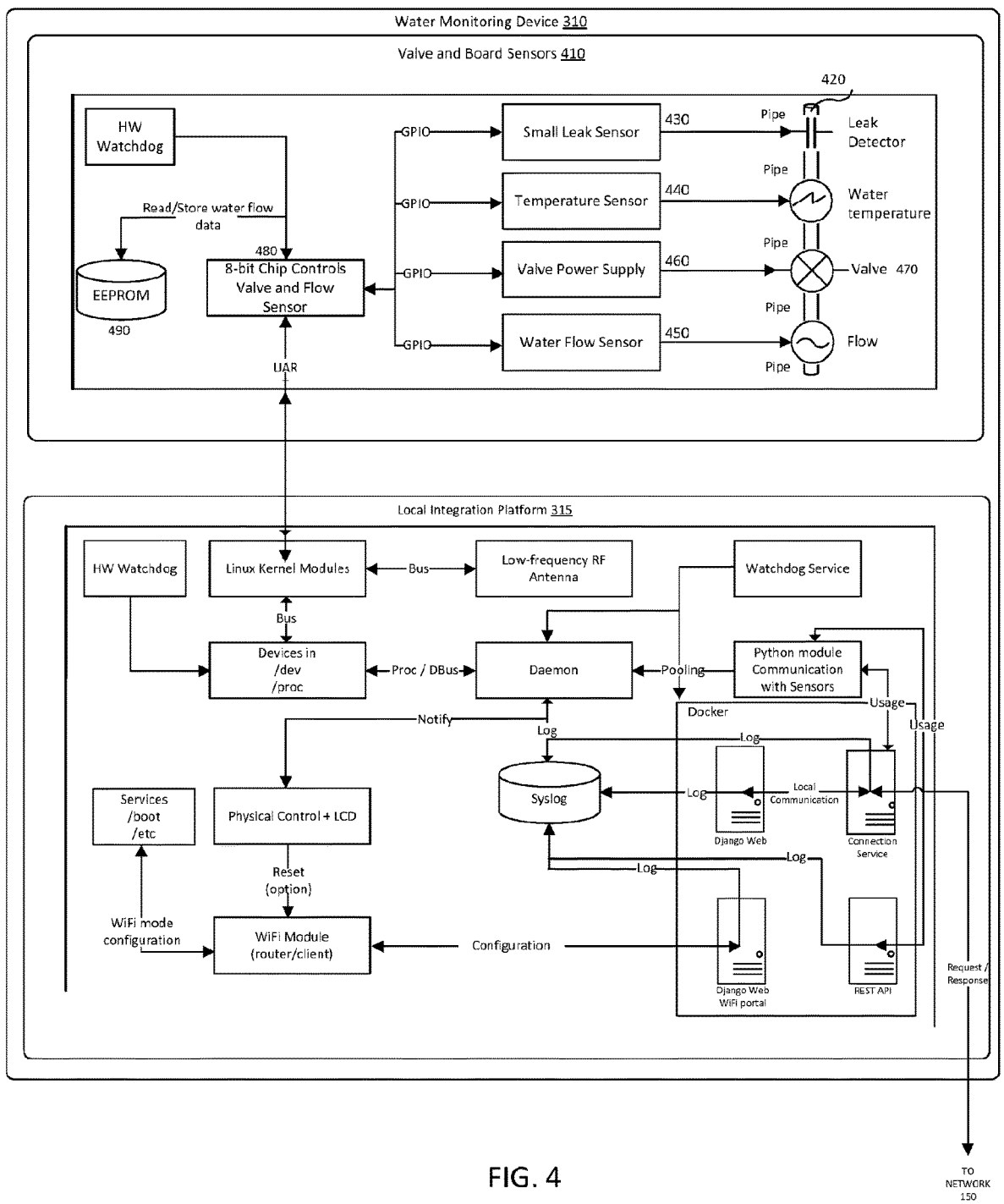
FIG. 4 is a schematic diagram of an exemplary water monitoring device of the local system of FIG. 3, consistent with disclosed embodiments.

FIG. 4 is a schematic diagram of an exemplary embodiment of the water monitoring device 310. The water monitoring device 310 includes an exemplary embodiment of the local integration platform 315 and a suite of valve and board sensors 410. The valve and board sensors 410 are connected in relation to a pipe 420 which makes up a portion of the water flow system 170 at the main water inlet 180. The valve and board sensors 410 preferably include a small leak sensor 430, a temperature sensor 440, and a water flow sensor 450. The small leak sensor 430 is preferably a pressure sensor configured to measure a pressure in the pipe 420. The small leak sensor 430 is configured to monitor pressure values and provide the data to the local integration platform 315 for being provided to the back-end system 110 and/or for determining the presence of a leak within the water flow system 170. In another embodiment, the small leak sensor 440 may be a vibration sensor. The vibration sensor may be configured to monitor the water flow system 170 for vibrations which may indicate the presence of a leak. The temperature sensor 440 and water flow sensor 450 are configured to measure associated data (e.g., temperature, flow rate) and provide the data to the local integration platform 315 and, in some cases, the back-end system 110. The local integration platform 315 is configured to constantly update certain parameters of water flow based on readings from the sensors 430-450.

The water monitoring device 310 also includes a valve power supply 460 and at least one valve 470. The powered valve 470 is configured to cease flow by closing a portion of the pipe 420 at the location of the valve, based on a signal from the power supply 460. The valve 470 may be, for example, a ball valve which is controlled based on an electric signal. The valve and board sensors 410 further include a controller 480 and memory 490 which are configured to provide signals to close and/or open the valve 460 based on communication with the local integration platform 315.

Figure 5:
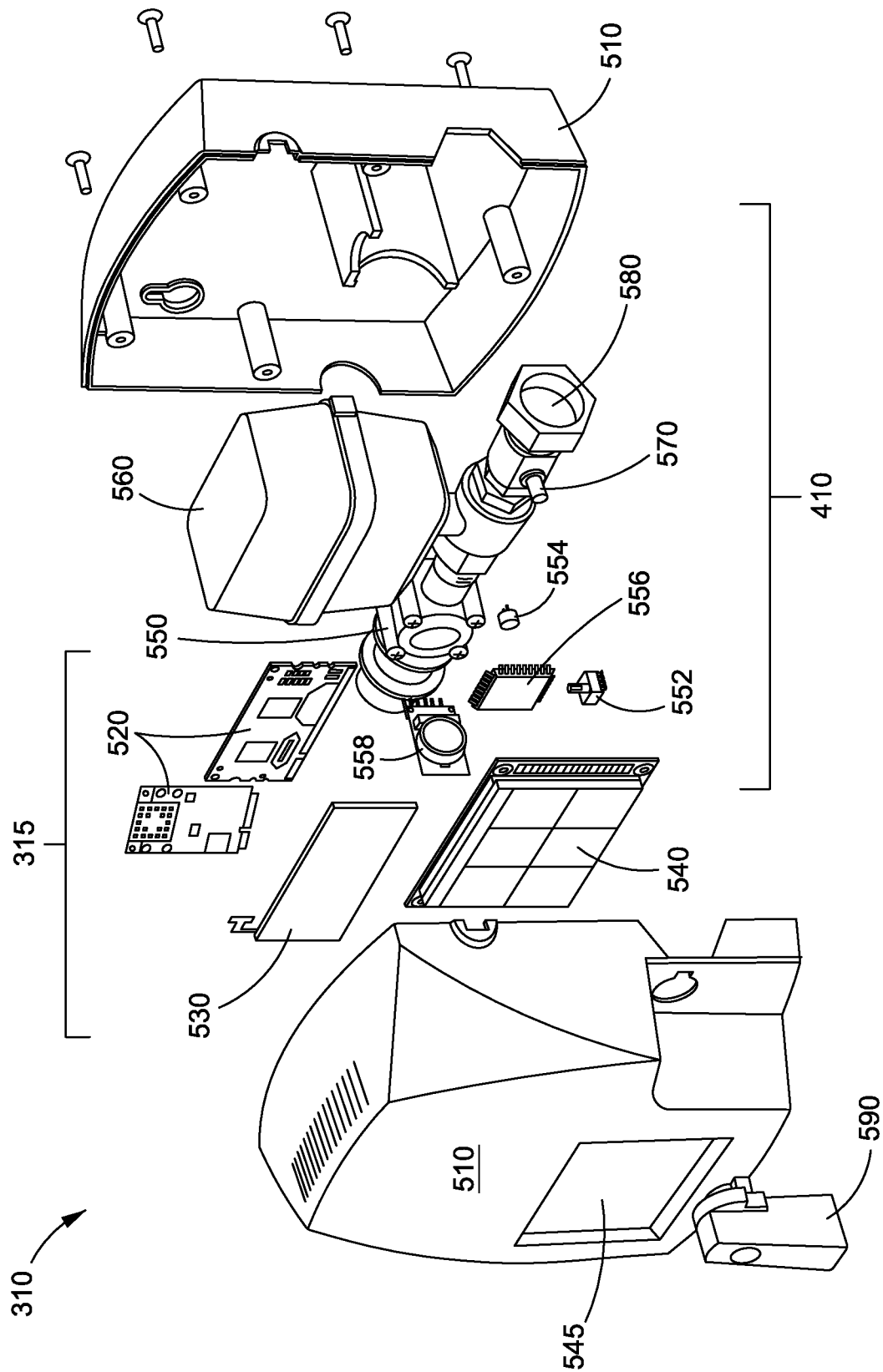
FIG. 5 is an exploded view of an exemplary water monitoring device, consistent with disclosed embodiments.

FIG. 5 is an exploded view of an exemplary embodiment of the water monitoring device 310. The water monitoring device 310 includes a housing 510 for enclosing the local integration platform 315 and the valve and board sensors 410. The local integration platform 315 includes computing components including processors and memory 520, a power source 530, and a control panel 540. In one embodiment, the power source 530 may include a power cord for connecting a building power supply (not shown) and/or a back-up battery that may provide power when the primary power source is not available (e.g., during a power outage). The housing 510 includes a window 545 for receiving the control panel 540 and allowing a user P to view and interact with the control panel 540.

In the illustrated exemplary embodiment, the valve and board sensors 410 include flow sensor 550, pressure sensor 552, and temperature sensor 554. Additional components may include, for example, a real time clock 556 and a siren/alarm 558. The valve and board sensors 410 also include valves for controlling the flow of water through the water monitoring device 310. The valves include, for example, an automatic shut-off valve 560 and a manual shut-off valve 570.

The water monitoring device 310 further includes a connection element 580. The connection element 580 includes a pipe section which is configured to be installed into the water flow system 170. The connection element 580 includes an inlet section and an outlet section which are inserted into the water flow system 170 downstream of the main water inlet 180 such that water flows into the inlet section from the main water inlet 180 and out of the outlet section to the rest of the building 160. The valve and board sensors 410 are located in and around the connection element 580 in a manner to collect relevant data, such as temperature, pressure, flow rate, vibration, etc (e.g., via sensors 550, 552, and 554). The automatic shut-off valve 560 includes a powered valve which is controlled by the local integration platform 315 to open and close at selected times. The housing 510 preferably includes a handle 590 which is connected to the manual shut-off valve 570 which allows the user P to manually turn off the water at the location of the water monitoring device 310.

Figure 6:
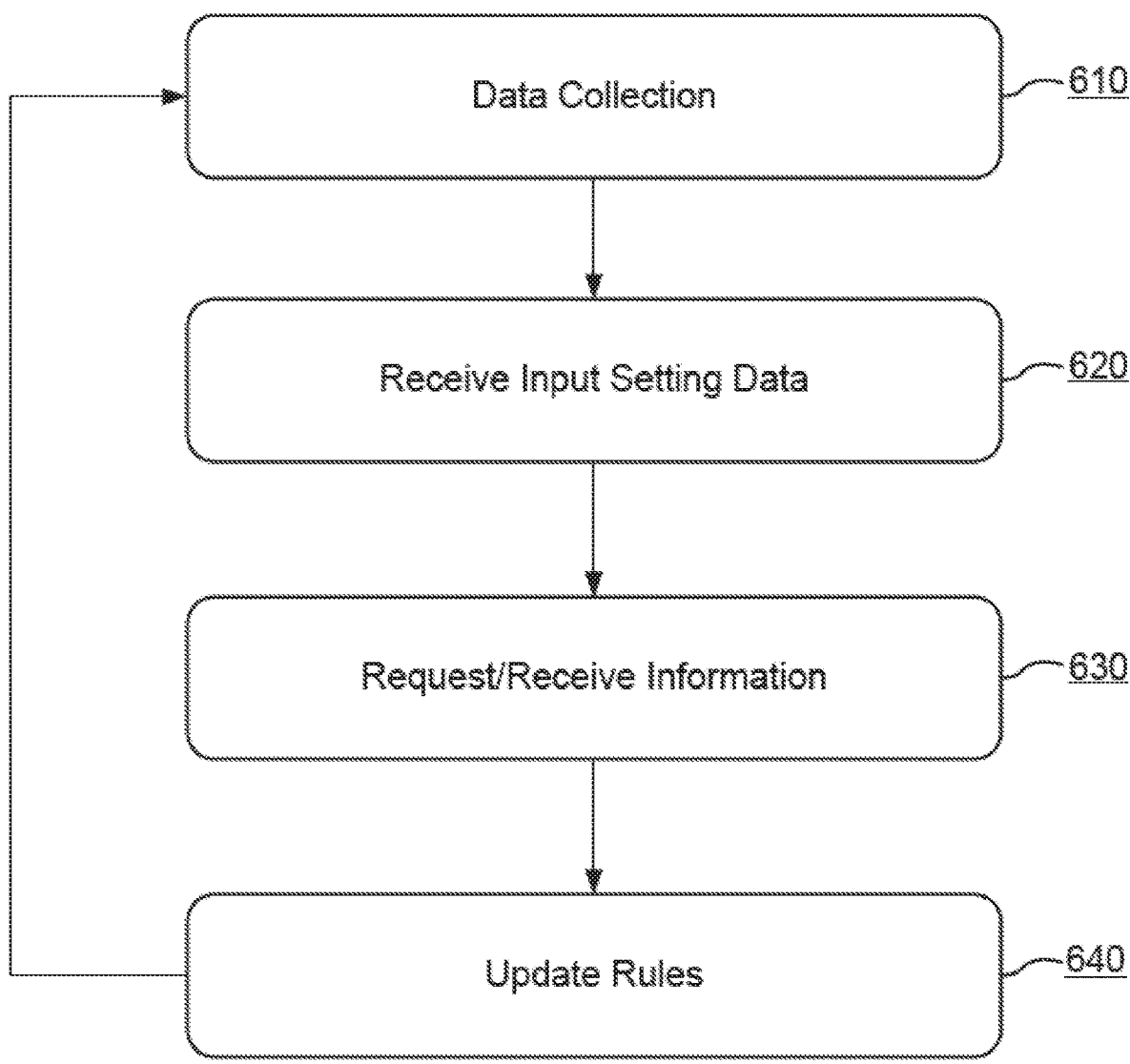
FIG. 6 is a flowchart of an exemplary learning process, consistent with disclosed embodiments.

FIG. 6 is a flowchart of an exemplary learning process 600 for training the back-end system 110 for alerting the user P and controlling the automatic shut-off valve 560 via the water monitoring device 310. The back-end system 110 performs one or more steps of the learning process 600, such as by the processor 210 executing instructions stored in the memory 220. In some embodiments, the modules 240-270 or one or more other modules may include software or hardware which is incorporated into the learning process 600.

In step 610, the back-end system 110 collects data. The local system 120 receives data and transmits the data to the back-end system 110. In one example, this data includes water monitoring data from the water monitoring device 310. The water monitoring data includes, for example, water flow statistics gathered by the sensors 430, 440, and 450. In an embodiment, the back-end system 110 receives a water usage map which includes detailed water use and the associated time of the use, including time, date, day of the week, etc. The back-end system 110 may also collect location data associated with the user P, such as location data collected by the local system 120.

In step 620, the back-end system 110 receives input setting data. The local system 120 may receive input setting data as input from the user P and provide the data to the back-end system 110. The input setting data includes information which further provides indicators of normal water usage within the building 160. For example, the input setting data may include a normal work schedule of the user P such that the back-end system 110 is apprised of when to expect the user P to be home. In another example, the input setting data includes a schedule for normal water use, such as the timing of an irrigation system (e.g., sprinkler system). In another example, the input setting data may include custom water leak thresholds. For example, the user P may input thresholds which represent unintended use of water within the building 160. In some embodiments, the thresholds may include a "home" mode threshold and an "away" mode threshold.

In step 630, the back-end system 110 requests and receives additional information. The additional information may include further information about normal water usage. For example, the back-end system 110 may identify a water usage event and request additional information, such as whether the water usage event is a normally scheduled occurrence or whether it was a one-off event. The back-end system 110 may provide the request for additional information to the local system 120 and/or directly to the client device 130 such that the user P can provide the requested information.

In step 640, the back-end system 110 analyzes the information received in steps 610-630 and determines and/or updates rules associated with normal water usage. For example, the back-end system 110 may identify certain water flow thresholds which would fall outside of normal water use for the particular building 160. These thresholds may vary depending on the time of day, day of the week, month, etc. The thresholds may additionally or alternatively depend on the location of the user P. For example, if the user P is not at the building 160, the threshold for normal water use may be lower than when the user P is present.

The learning process 600 may take place after an initial installation of a water monitoring device 310 to thereby allow the back-end system 110 to learn about the habits of the user P (and any other associated users). The machine learning module 250 may include one or more software processes which are carried out to generate information requests (step 630) and water value thresholds (step 640) which are used as rules for determining when a water usage is intended and when it represents an unwanted use, such as a burst pipe. These rules set parameters for when the back-end system 110 and/or local system 120 should provide an alert to the user P and/or should take a corrective action such as shutting off the water by way of the water monitoring device 310. The learning process 600 may continuously repeat by gathering information from the various components in the water monitoring system 100 (steps 610-630) and updating the rules based on the collected data and machine learning algorithms (step 640).

Figure 7:
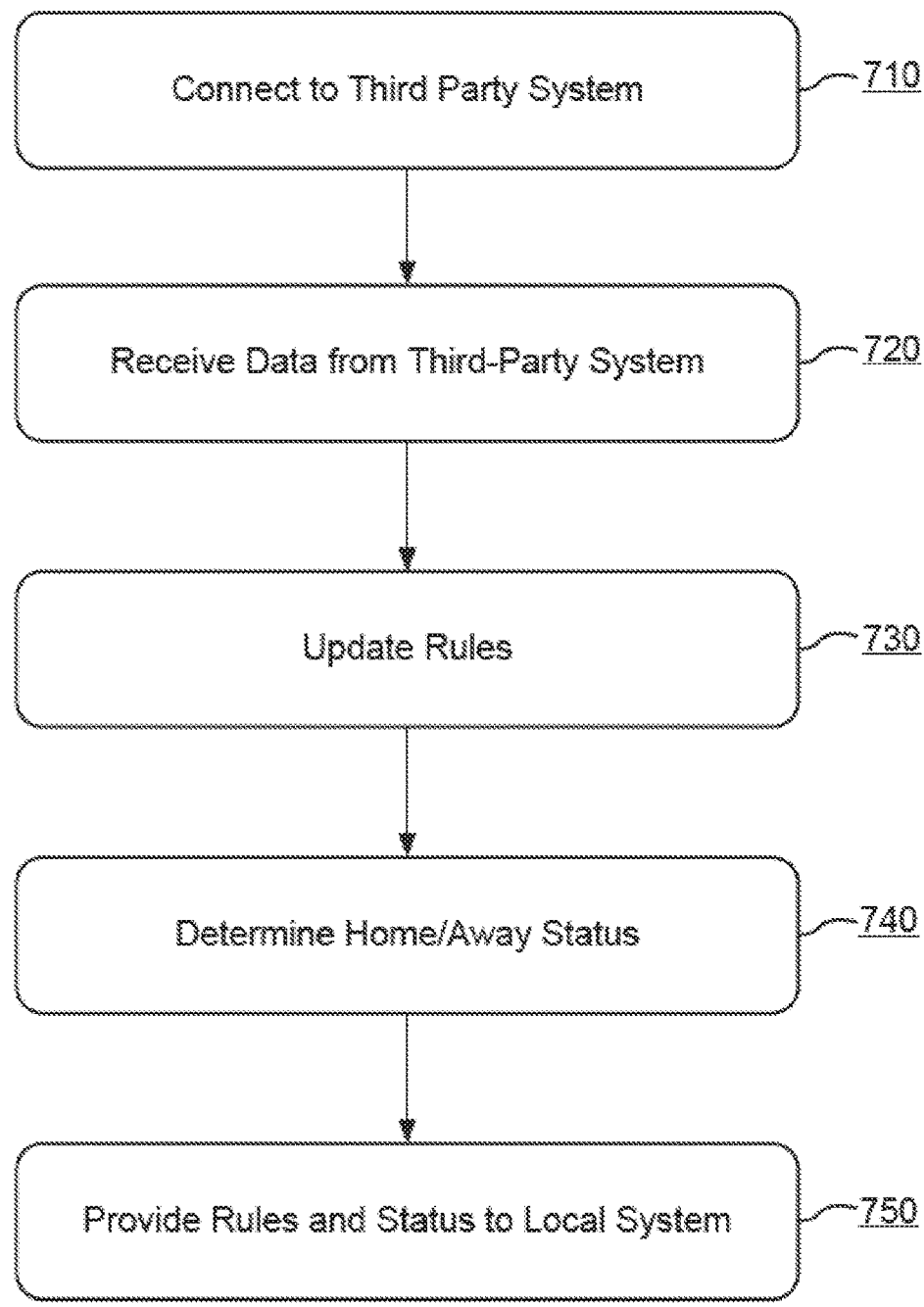
FIG. 7 is a flowchart of an exemplary learning process using third-party system integration, consistent with disclosed embodiments.

FIG. 7 is a flowchart of another exemplary process 700 for the back-end system 110 to perform machine learning to further establish rules for the water monitoring device 310. The back-end system 110 may perform one or more steps of process 700 in order to further refine the rules which define actions which are taken by the back-end system 110 and the local system 120. In some aspects, the process 700 is part of the integration platform of the water monitoring system 100 in that the process 700 includes steps for allowing the third-party system 130 to provide information which is used by the back-end system 110 to control the water monitoring device 310.

In step 710, the back-end system 110 connects to the third-party system 140. This may include the back-end system 110 registering an account with the third-party system 140 and performing an authentication with the authentication module 240 in order to associate the third-party account of the user P with their back-end system account. The third-party system 140 may be associated with an automation service, such as those provided by Amazon, Apple, Google, etc. The third-party system 140 may register with the back-end system through the third-party module 270 (e.g., via an open API) in order to integrate third-party services into the back-end system 110.

In step 720, the back-end system 110 receives data from the third-party system 140. For example, the back-end system 110 may receive location data from a third-party system 140 with access to location data. In one example, the third-party system 140 is associated with a security system which monitors a status of the building 160. The security system may track location data which includes whether the user P is at the building 160 or away (i.e., depending on an armed/unarmed status of the security system). In another example, the third-party system 140 may be associated with a location-based service, a feature which has become common with many mobile applications. The third-party system 140 may receive location data associated with the user P based on the location of the client device 130 which is running the associated application. In yet another example, the third-party system 140 is associated with a smart speaker which includes a microphone and is configured to listen for speech within the home to determine whether the user P (or another individual) is present. The location data can also be mapped according to the time, date, and day of the week, indicating when the user P is home and when the user is away.

In step 730, the back-end system 110 updates the rules associated with a local system 120 based on information received from the third-party system 140. For example, the back-end system 110 (e.g., through the machine learning module 250) may modify an expected schedule of when the user is home or away and may match the location data to water usage. This information further provides the back-end system 110 with data which shows patterns of usage of water within an associated building 160. For example, the back-end system 110 may determine that water usage never exceeds a certain threshold when the user is away from the building 160 and set the threshold for an "away" mode accordingly.

In step 740, the back-end system 110 is configured to set a status for the water monitoring device 310. For example, the machine learning module 250 may review location information to determine whether the water monitoring device 310 should enter a "home" mode or an "away" mode. Each mode may include different rules or thresholds which indicate a particular action that should be taken. For example, when the water monitoring device 310 is in a "home" mode, the thresholds for normal water use are much higher than the thresholds associated with the "away" mode.

In step 750, the back-end system 110 provides the update rules and status to the water monitoring device 310. The water monitoring device 310 is thereby continuously updated with rules and a current home/away status through machine learning which accounts for information which is not directly determined by the water monitoring device 310. In particular, data collected through third-party systems 140 supplements the data and rules from the learning process 600 in order to provide a more comprehensive artificial intelligence scheme which more accurately assesses and identifies water usage.

Figure 8:
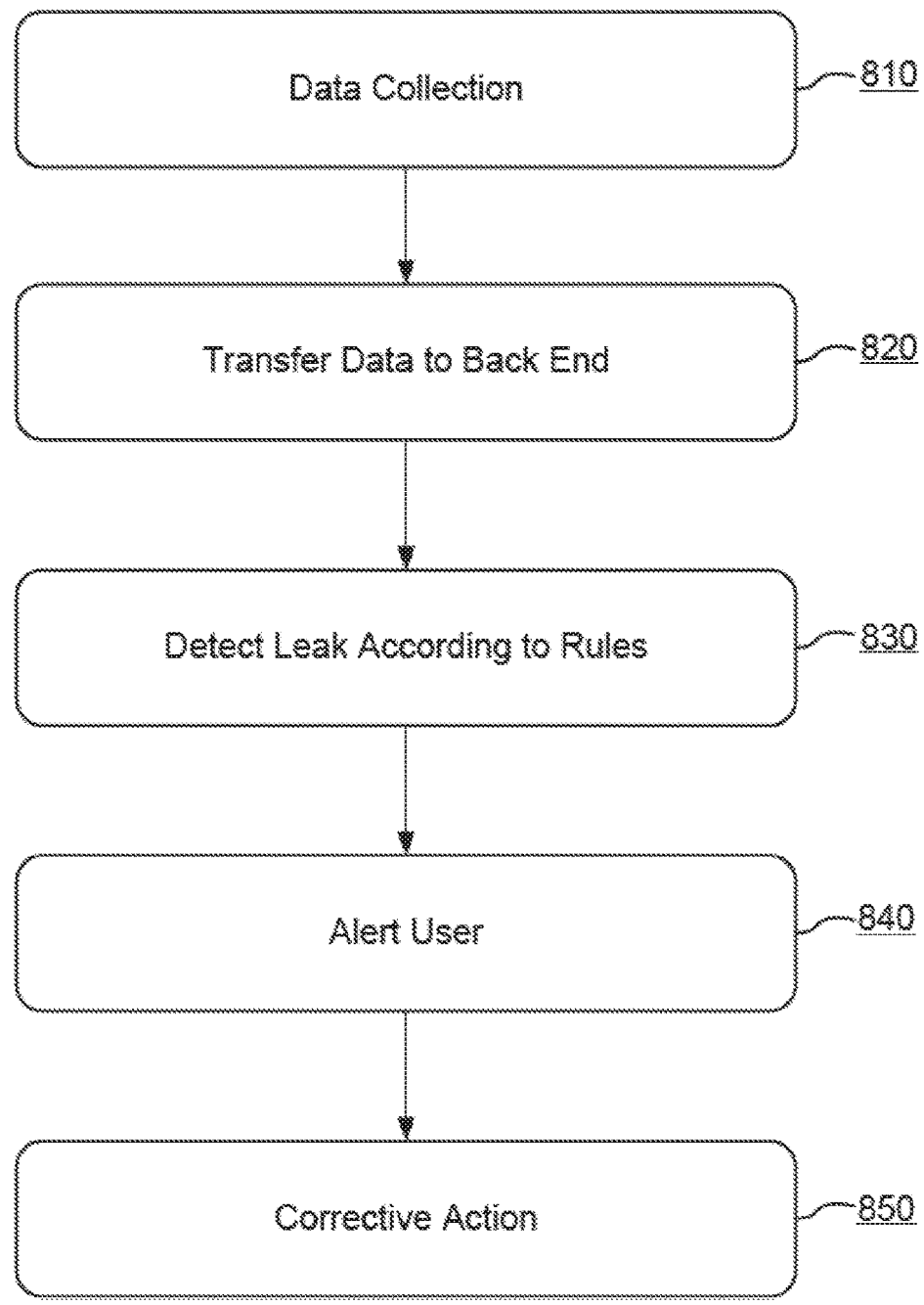
FIG. 8 is a flowchart of an exemplary alerting process, consistent with disclosed embodiments.

FIG. 8 is a flowchart of an exemplary alert process 800, consistent with disclosed embodiments. In some embodiments, the local system 120 may perform one or more steps of the process 800 in order to provide an alert to a user. The process 800 may be performed based on rules or control logic which is stored by the local integration platform 315 and which are received from the back-end system 110. In other embodiments, the back-end system 110 may perform one or steps of the process 800, such as in situations in which the rules or control logic is stored by the back-end system 110.

In step 810, the water monitoring device 310 collects water flow data through the sensors (e.g., sensors 430, 440, 450). The water flow data includes one or more of flow rate, temperature, pressure, and vibration measurements which are taken periodically over time. The water monitoring device 310 collects the data and, in step 820 provides the data to the back-end system 110 through the local integration platform 315. The back-end system 110 receives the data, updates rules through the machine learning processes (e.g., process 600), and provides the updated rules back to the water monitoring device 310.

In step 830, the water monitoring device 310 further performs a check according to the current rules or control logic in order to detect a leak. For example, the water monitoring device 310 may compare a pressure or flow rate measurement to a threshold to determine whether the water usage is likely unintended and thus a leak is occurring. The threshold may be based on the rules and therefore may depend on factors such as day of the week, date, time, home/away status, in order to accurately represent water usage as expected or unexpected.

In another example, the water monitoring device 310 may identify a leak, such as a small leak, based on a stored pattern associated with such a leak. For example, a very small flow rate over a long period of time may be associated with a small leak. In another example, the water monitoring device 310 may be configured to identify vibration patterns within the water flow system 170 to identify a leak.

In step 840, the water monitoring device 310 initiates an alert to notify the user P. For example, the water monitoring device 310 may identify an leak and cause an alert instruction to be sent to the client device 130, thereby alerting the user P of the situation. The alert instruction may depend on the leak which is identified (e.g., based on the severity of the situation). For a large leak (e.g., burst pipe), the water monitoring device 310 may send a push notification (e.g., through a mobile application) which notifies the user P immediately. Other options for alerting the user P include text message, email, phone call, etc. For a small leak, the water monitoring device 310 may only present a notification locally on an interface, such as the control panel 540. In another embodiment, the water monitoring device 310 may sound an alarm as an audible alert.

While the water monitoring device 310 is described as alerting the user P, it should be understood that any of the components of the water monitoring system 100 may cause the alert to be provided to the user P (e.g., through the client device 130). For example, the back-end system 110 may identify the leak based on the data received in step 830. The back-end system 110 may additionally or alternatively perform a leak detection analysis (e.g., step 830) to identify abnormal water usage and provide an alert to the client device 130.

The integration platform 315 or back-end system 110 may generate the alert instruction based on a status mode of the water monitoring device 310. For example, if the water monitoring device 310 is in an "away" mode, the alert instruction may be delivered to a client device 130 which is likely to be with the user P, such as a smart phone. In addition, the alert instruction may be delivered to a third-party system 140, such as a third-party which may be capable of contacting the user P and/or dispatching a remediation team to the building 160. If the water monitoring device 310 is in a "home" mode, the alert instruction may include a message to a client device 130 which is likely to be in range of the user P, such as a smart speaker or security system.

In step 850, the water monitoring device 310 performs a corrective action in certain situations. For example, when a major leak is detected (e.g., burst pipe, leak for a long period of time), the water monitoring device 310 may determine that the water should be shut-off to minimize water damage from the potential leak. The water monitoring device 310 may use the stored rules or control logic to determine which leaks identified in step 840 are associated with a corrective action and perform the corrective action when needed. For example, the water monitoring device 310 may send a signal to close the automatic shut-off valve 560.

While the corrective action may be automatic based on the control logic, in other embodiments or instances the corrective action may be performed based on input from the user P. For example, after receiving a notification that a leak is occurring, the user P may enter an instruction to turn off the water. This may include the client device 130 receiving the input instruction and transmitting the instruction to the water monitoring device 310, either directly or through one or more of the back-end system 110 and third-party system 140. In another example, the user P may provide input directly to the water monitoring device 130, such as through the control panel 540.

The water integration platform 315 and/or the back-end system 110 is also configured to determine whether to perform a corrective action based on the alert instruction from step 840. For example, some alert instructions may include an associated corrective action, such as an automatic water shut-off. In this way, the corrective action may depend on certain conditions, such as the "home" or "away" status of the water monitoring device 130.

Figure 9:
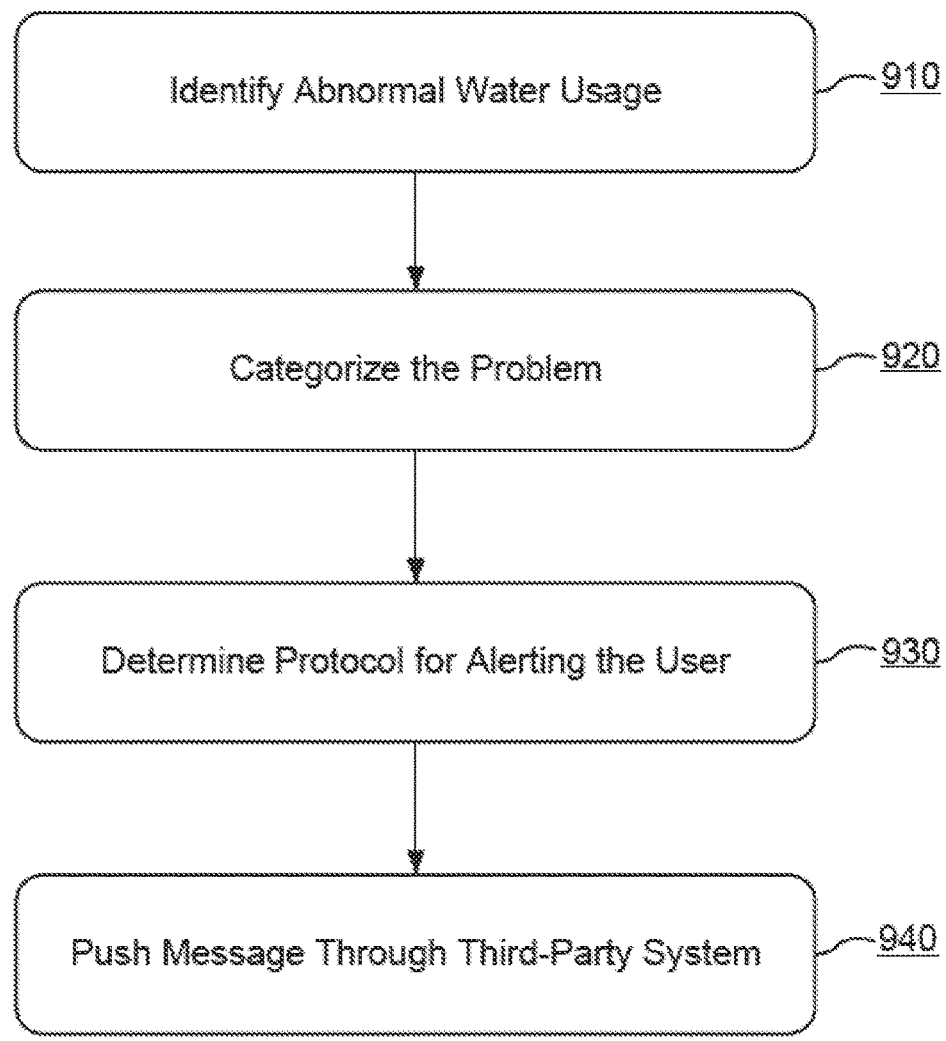
FIG. 9 is a flowchart of an exemplary alerting process using third-party system integration, consistent with disclosed embodiments.

FIG. 9 is a flowchart of an exemplary process 900 for providing an alert to the user through an integrated third-party system 140. The process 900 may be used in addition to or alternative to the process 800 and may be a specific embodiment of the process 800. The water monitoring device 310 (e.g., through the local integration platform 315) may perform one or more steps of the process 900 to communicate with the user P through a client device 130 associated with a third-party system 140.

In step 910, the water monitoring device 310 identifies abnormal water usage. For example, the water monitoring device 310 may compare water flow data to stored rules or control logic to determine whether a leak is occurring. The water monitoring device 310 may identify a leak through one or more of the leak detection processes described herein. For example, the small leak sensor 430 may detect a water pressure or vibration pattern which indicates a leak has occurred.

In some embodiments, the water monitoring device 310 may be connected to a third-party system 140 capable of detecting a leak or other abnormal water usage and communicating the leak to the local integration platform 315 through the network 150. In one example, the local system 120 may include external sensors 370 which are associated with a third-party service or entity. These sensors 370 may include moisture sensors, flow sensors, pressure sensors, etc. which are located remote from the water monitoring device 310 and which are configured to send signals to the water monitoring device 310 in order to identify leak conditions. These local integration platform 315 may include one or more components which facilitate a connection with the external sensors 370, such as Wi-Fi or Bluetooth™ connections. In some embodiments, the third-party devices (e.g., external sensors 370) may collect data independently and transmit the data to the third-party system 140. The third-party system 140 may provide the data to the back-end system 110 which in turn communicates with the local system 120.

In step 920, the water monitoring device 310 categorizes the problem. For example, water monitoring device 310 may determine whether the detected abnormal water usage represents a small leak or a major leak, as these situations may be handled differently. In step 930, the water monitoring device 310 determines a protocol for alerting the user P based on the categorized leak. For example, if the leak is a small leak, a text message or similar alert may be delivered to the client device 130. For larger leaks, such as a burst pipe or unattended running faucet, a third-party system 140 may be involved to provide a more comprehensive alert and/or remedy to the situation.

In step 940, a message is pushed through the third-party system 140. For example, the water monitoring device 310 may determine that a major leak is occurring and perform a process through the local integration platform 315 that provides a message to a user P through a third-party system 140 or associated service. In one example, the local integration platform 315 may include connections (e.g., through the back-end system 110) to a third-party security system. The local integration platform 315 may cause a message to be sent to the third-party system 140 associated with the security system, thereby notifying an entity monitoring the status of the building 160. In another example, the third-party system 140 may be associated with a home automation system. The local integration platform may cause a message to be sent through the home automation system such that the user P may receive water usage alerts in a centralized location with other home automation alerts.

It should be understood that the third-party integration messaging is not limited to any particular leaks (e.g., major leaks) and can be used to integrate the water monitoring device 310 and the associated messages into any third-party system. For example, the local integration platform 315 may push a message through a third-party system to alert a user using a client device 130 such as a smart speaker. The smart speaker may produce an audible message which alerts the user P of the small leak and the location, if known.

The present disclosure includes one or more systems which provide a water monitoring device for monitoring water usage within a building. The water monitoring system includes one or more components which are configured to collect data from multiple sources, including different water monitoring devices as well as third-party devices, in order to perform machine learning processes in order to generate rules or control logic which accurately represent water flow as either intended or unintended. The integration of third-party devices through an integration platform enables the overall water monitoring system to collect additional data which is useful in assessing water flow, as well as providing additional routes for alerting and/or otherwise communicating with a user (e.g., through a client device). The overall system fits into an overall home automation scheme and provides an additional resource to the user, monitoring the water usage, providing feedback, and taking corrective actions where necessary to avoid unnecessary damage and expense due to unintended water usage.

FIGS. 10-13 are exemplary user interfaces 1000, 1100, 1200, and 1300 which may be implemented through the back-end system 110 and displayed to a user P through the client device 130. In one embodiment, interfaces 1000 and 1100 include an exemplary web browser arrangement. Interfaces 1200 and 1300 are suitable for the control panel 540 or a mobile application which is presented through the client device 130.

Figure 10:
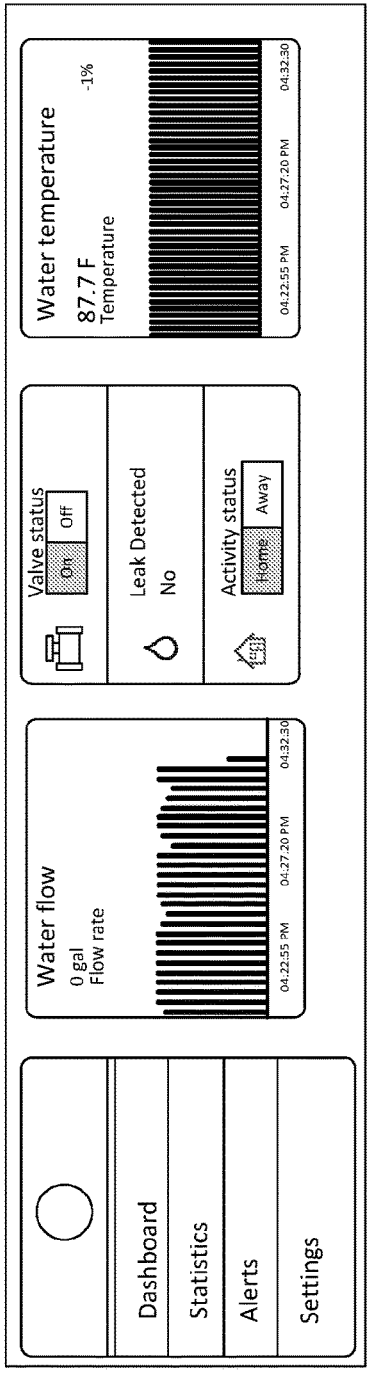
FIG. 10 is an exemplary user interface which may be presented using a display, consistent with disclosed embodiments.
Figure 11:
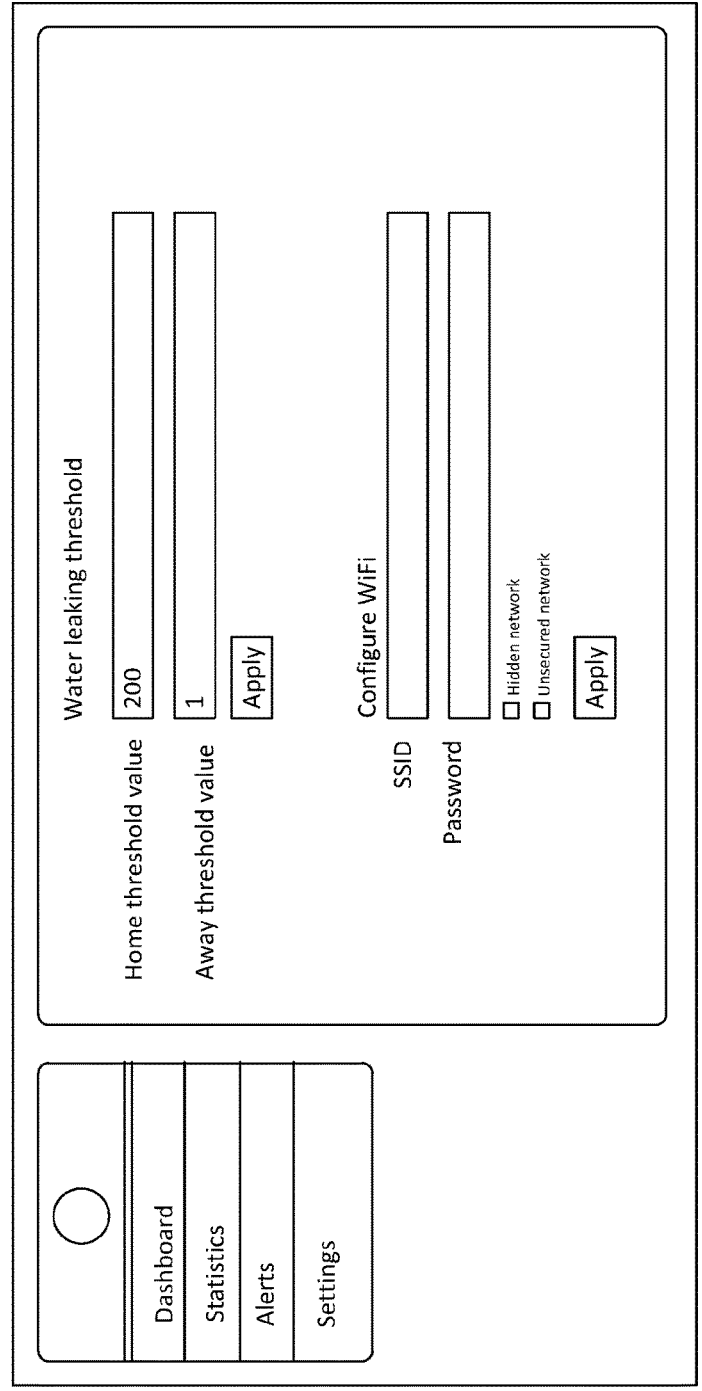
FIG. 11 is another exemplary user interface which may be presented using a display, consistent with disclosed embodiments.
Figure 12:
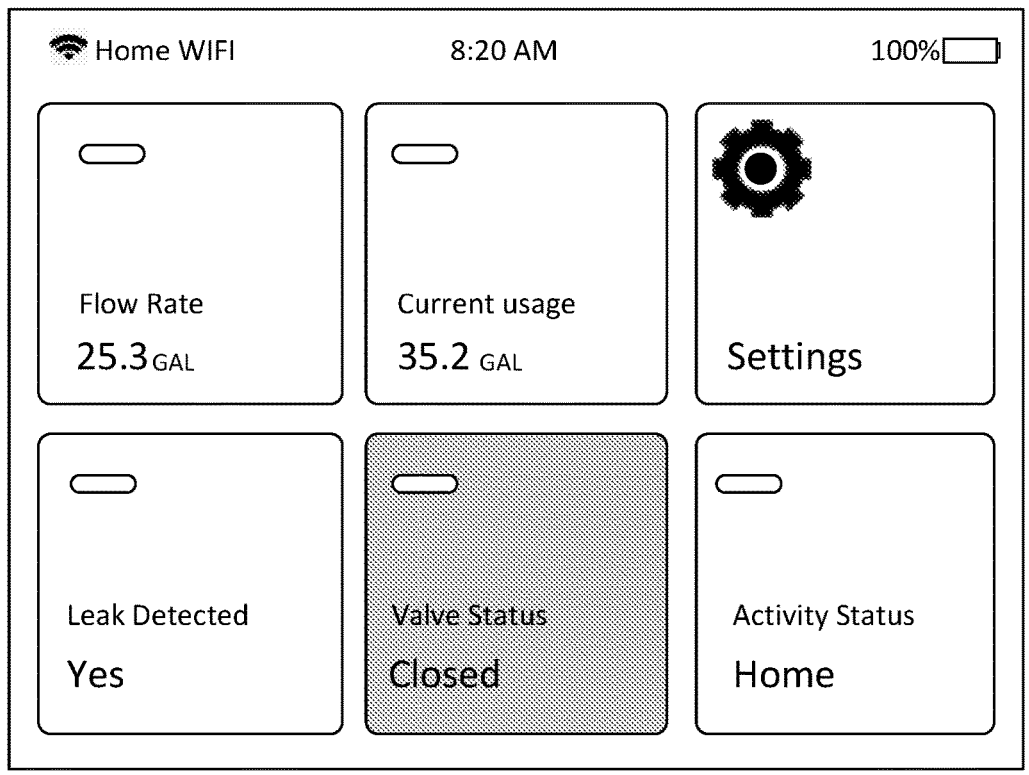
FIG. 12 is another exemplary user interface using a display, consistent with disclosed embodiments.
Figure 13:
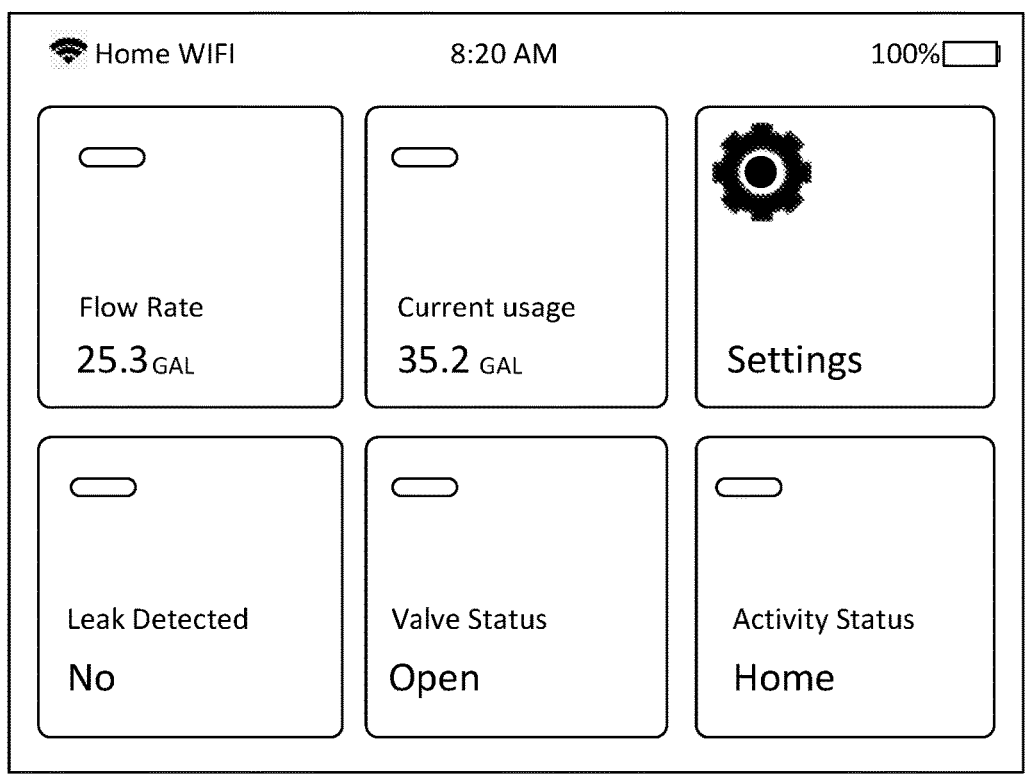
FIG. 13 is another exemplary user interface which may be presented using a display, consistent with disclosed embodiments.

As shown in FIG. 10, the user interface 1000 includes a dashboard section which provides some information about the status of the water monitoring device 310 and the associated water flow. The information may include, for example, the current water flow, past water flow, status of the automatic shut-off valve, status of whether a leak is detected, "home" or "away" mode status, and water temperature (current and past temperature). This information provides a snapshot of the status of the water flow and provides feedback to the user which is not present in a conventional water meter. As shown in FIG. 11, the user interface 1100 includes an input settings interface which enables a user P to provide information. For example, the user interface 1100 includes an option for the user P to input customized thresholds for detecting a leak. The user interface 1100 also includes input fields for connecting the water monitoring device 310 to the network 150, such as a Wi-Fi network. As shown in FIGS. 12-13, the user interfaces 1200 and 1300 include another representation of the dashboard and include flow rate, current usage, leak detection, valve status, and "home" or "away" status.

The embodiments of the present disclosure may be implemented with any combination of hardware and software. For example, computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The system and processes of the figures are not exclusive. Other systems, processes and interfaces may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

The invention claimed is:

1. A computer-implemented method for detecting a leak in a water flow system, comprising:
   connecting to a water monitoring device and a third-party system;
   receiving water flow data from the water monitoring device,
   receiving location data from the third-party system, wherein the location data is indicative of a location of a person, wherein the third-party system is a security system and the location data includes an armed status of the security system;
   determining a threshold parameter based on the location data; and
   comparing the water flow data to the threshold parameter in order to determine that there is a leak in the water flow system.

2. The computer-implemented method of claim 1, further comprising authenticating the connection to the water monitoring device and the third-party system to the person.

3. The computer-implemented method of claim 1, wherein the water flow data includes water pressure.

4. The computer-implemented method of claim 1, wherein the water flow data includes flow rate.

5. The computer-implemented method of claim 1, wherein determining a threshold parameter based on the location data includes determining whether the water monitoring device is in a home or away mode.

6. The computer-implemented method of claim 1, further comprising sending an alert instruction to a client device indicating that a leak was detected.

7. The computer-implemented method of claim 6, wherein the client device is a component of the third-party system and the alert is directed to the client device through a back-end system device.

8. The computer-implemented method of claim 7, wherein the client device is a smart speaker and the alert is an audible alert played through the smart speaker.

9. A water monitoring system, comprising:
- a back-end system comprising an authentication module, a machine learning module, an alerts module, and a third-party module,
- wherein the back-end system is configured to remotely connect to a local system comprising a water monitoring device and the authentication module is configured to authenticate the connection related to a person,
- the back-end system is configured to remotely connect to a third-party system using the third-party module and the authentication module is configured to authenticate the connection related to the person,
- the back-end system receives data from the local system and the third-party system, wherein the data received from the third-party system is indicative of a location of the person, wherein the third-party system is a virtual assistant system and the data from the third-party system is based on detection of a voice within a range of the third-party system associated with the virtual assistant system,
- the machine learning module is configured to analyze the data to determine one or more rules which identify water usage as intended or unintended, and
- the alerts module is configured to provide an alert to one or more of the local system, the third-party system, or a client device when the water monitoring device measures water flow data Which indicates a leak according to the one or more rules.

10. The water monitoring system of claim 9, wherein the data received from the local system includes water flow data.

11. The water monitoring system of claim 10, wherein the water Flow data includes water pressure data.

12. The water monitoring system of claim 10, wherein the water flow data includes flow rate data.

13. The water monitoring system of claim 10, wherein the water flow data include vibration data.

14. The water monitoring system of claim 9, wherein the third-party module includes an open application programming interface module.

15. The water monitoring system of claim 9, where the data received from the local system includes water usage statistics and associated timing of the water usage.

16. The water monitoring system of claim 15, wherein the machine learning module is configured to analyze the data received from the local system and identify patterns of intended water usage.

\* \* \* \* \*